Aug. 6, 1935.  J. J. JANCA  2,010,545
OSCILLATING FAN
Filed March 16, 1934  2 Sheets-Sheet 1

Inventor
Joseph J. Janca
By Rippey & Kingsland
His Attorneys.

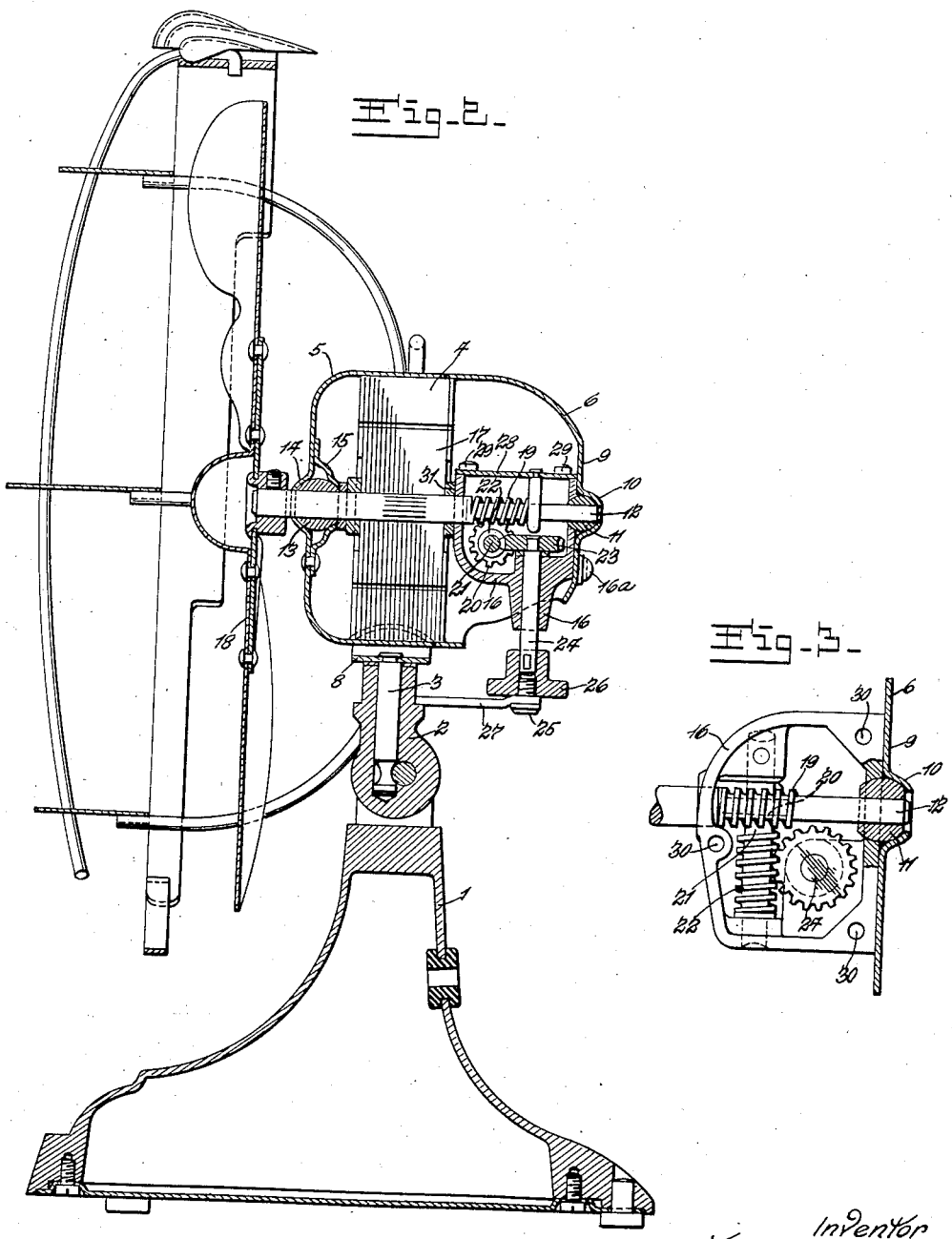

Patented Aug. 6, 1935

2,010,545

UNITED STATES PATENT OFFICE 2,010,545

OSCILLATING FAN

Joseph J. Janca, St. Louis, Mo., assignor to The Emerson Electric Mfg. Co., St. Louis, Mo., a corporation of Missouri Application March 16, 1934, Serial No. 715,896

3 Claims. (Cl. 230—256)

This invention relates to oscillating electric fans.

An object of this invention is to provide a fan having reducing gears for the oscillating mechanism enclosed in a gear box within the motor housing, in order to provide a fan which is economical to manufacture and durable in service, and which will lend itself to a pleasing compact design.

Other and specific objects will be apparent from the following detail description, taken in connection with the accompanying drawings, in which—

Fig. 2 is a vertical section through the fan; and

Fig. 3 is a plan view of the gear box with the adjacent shell of the motor housing in section and with the cover plate of the gear box removed.

Figure 1:
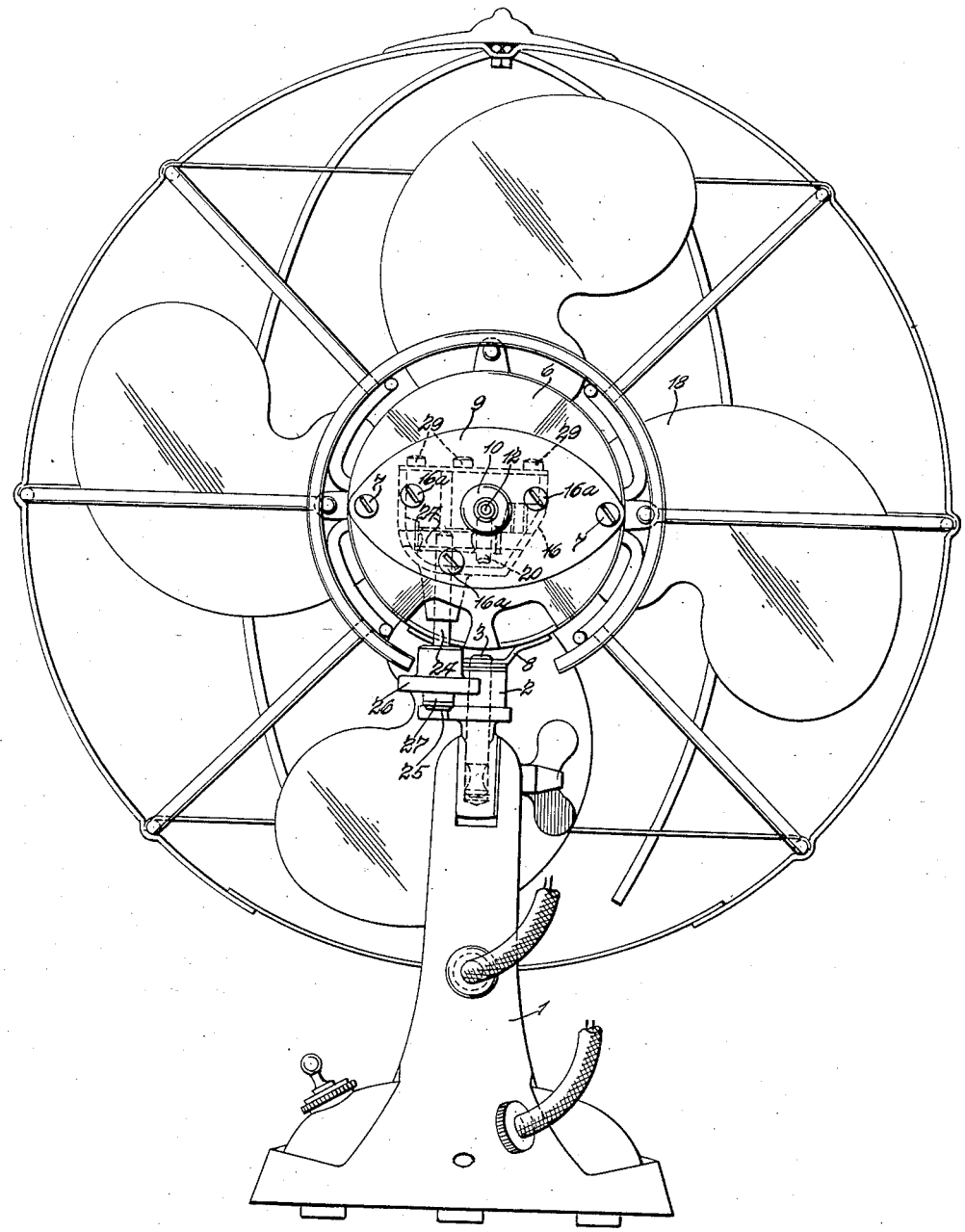
Fig. 1 is a rear elevation of the fan.

A fan embodying the invention includes a base 1, to which is pivotally connected a post 2 carrying a pin 3, which serves as an axis for the oscillations of the fan.

The fan motor includes the usual stator 4 which is assembled in the motor housing, comprising a front cup 5 and a rear cup 6. The stator 4 and the cups 5 and 6 are held in assembly by bolts 7, which pass through the stator and both cups. A strap 8 is secured to the bottom of the motor housing and is attached to the pin 3.

The rear cup 6 of the motor housing is formed with a flat face 9, except for a recessed portion 10 to receive a rear bearing 11.

The shaft 12 of the motor is wholly journalled in the rear bearing 11 and in a front bearing 13, which is secured in a recess 14 in the cup 5 by a plate 15. A gear box 16 is secured against the inner side of the flat surface 9 and inside the motor housing by screws 16a.

The motor shaft 12 has an armature 17 secured to it and carries a fan member 18 at its front end. It passes through an appropriate hole in the front wall of the gear box and carries a worm gear 19, which drives a pinion 20 on a countershaft 21. The countershaft 21 also carries a worm gear 22, which meshes with a pinion 23 on a crank shaft 24. A crank pin 25 is secured to a collar 26 on the crank shaft 24. A pitman 27 is connected between the post 2 and the crank pin 25.

As shown in Fig. 2, the rear wall of the gear box 16 serves as a securing member for the rear bearing 11. A cover plate 28 is secured to the gear box by screws 29 threaded in proper recesses 30 in the gear box. The arrangement is such that lubricant packed in the gear box serves also to lubricate the rear bearing 11.

By this construction the gear assembly is enclosed within the motor housing and the necessity for a third bearing has been eliminated. It will be understood that no bearing is provided for the shaft in the front wall of the gear case, but a grease retaining washer 31 is positioned between the armature 17 and the front wall of the gear box. It may also be pointed out that the rear bearing is centered and partly supported by the rear wall of the gear box.

Various changes may be made in the details of construction, within the scope of the appended claims, without departing from the spirit of this invention.

I claim:

1. In an oscillating fan, the improvement comprising a motor housing, a gear box secured on the interior of the housing to its rear wall, and a bearing at the rear wall of the housing for a shaft of the motor, centered and partly supported by the gear box and communicating with the interior of the gear box, whereby the bearing may be lubricated by lubricant in the box.

2. In an oscillating fan, the improvement comprising a motor housing including a front cup and a rear cup, a bearing for the shaft of the motor supported on the front cup, a gear box secured to the interior of the rear cup, and a bearing for the shaft supported by and between the gear box and the rear cup.

3. In an oscillating fan, the improvement comprising a motor housing including a rear cup member having a flat face with a recess therein, a gear box secured on the interior of the housing to said flat face, and a bearing for a shaft of the motor supported in said recess by the adjacent wall of the gear box and communicating with the interior of the box to permit its lubrication by lubricant in the box.

JOSEPH J. JANCA.